Figure 1:
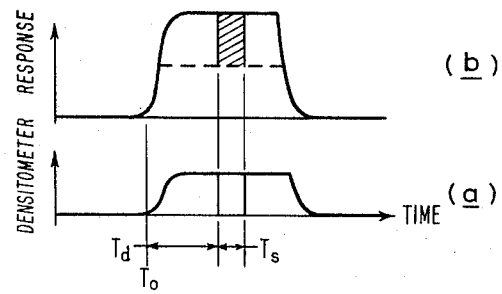

INVENTORS
WILLIAM B. LEHMANN
ARYE RON

BY Albert C. Smith

AGENT

INVENTORS
WILLIAM B. LEHMANN
ARYE RON
BY Albert C. Smith
AGENT

United States Patent Office 3,304,413
Patented Feb. 14, 1967

3,304,413
CARDIAC OUTPUT COMPUTER
William B. Lehmann, White Plains, N.Y., and Arye Ron, Brighton, Mass., assignors to Hewlett-Packard Company, Palo Alto, Calif., a corporation of California
Filed Mar. 26, 1963, Ser. No. 268,105
5 Claims. (Cl. 235—92)

This invention relates to the method and means for determining cardiac output from a plot of variations of an indicator in the bloodstream of a patient as a function of time.

It is known that cardiac output may be determined by injetcing a given amount of indicator, i.e. dye, cold or hot saline, radioactive material, etc., into a vein of a patient and by continuously monitoring the variations in concentration of the indicator in the blood flowing in the patient's artery. These methods are referred to as Dye Dilution, Thermo Dilution, etc., and are discussed extensively in the literature. (See: "Symposium on Use of Indicator-Dilution Technics in the Study of the Circulation," Circulation Research, vol. 10, No. 3, Part 2, March 1962.) Accurate results are obtained using this method if the injection of the indicator is rapid and smooth and if the indicator particles are counted only once, i.e., the indicator is not recirculated. A typical indicator curve for a non-recirculating system increases with time to a peak value and then decays substantially exponentially to zero. However, indicator curves obtained in actual tests conducted on patients are affected by recirculation. This is shown by a second peak which is lower than the first and which appears in the decaying portion of the typical curve. It thus becomes necessary to extract the required information on cardiac output from the portion of the curve of indicator concentration as a function of time which is obtained prior to the occurrence of recirculation of the indicator.

Accordingly, it is a principal object of the present invention to provide a method for accurately determining cardiac output in the presence of recirculation.

It is another object of the present invention to provide a method for accurately integrating a time-varying function over less than the total duration of the function.

It is still another object of the present invention to provide apparatus for integrating an indicator curve to determine the cardiac output accurately before the indicator is recirculated.

It is still another object of the present invention to provide a method and means for calibrating apparatus which measures cardiac output.

In accordance with a preferred embodiment of the present invention the curve of indicator concentration as determined by a detector is integrated as a function of time. The integration is performed normally from the beginning of the curve to its peak value and thereafter along the decaying portion of the curve to a value which is related to the peak amplitude. At this point the integration process is multiplied by a selected factor and the curve of the indicator concentration is integrated until it decays to a second value related to the peak amplitude. This integration process is completed prior to the occurrence of recirculation. The apparatus of the present invention performs this operation automatically and provides a reading which is directly proportional to the desired cardiac output information. A calibration cycle is provided to determine the response of the detector to whole blood and to a mixture of whole blood with a known amount of indicator. A typical application of the invention using dye as the indicator and a densitometer as the detector will be described hereinafter.

Figure 2:
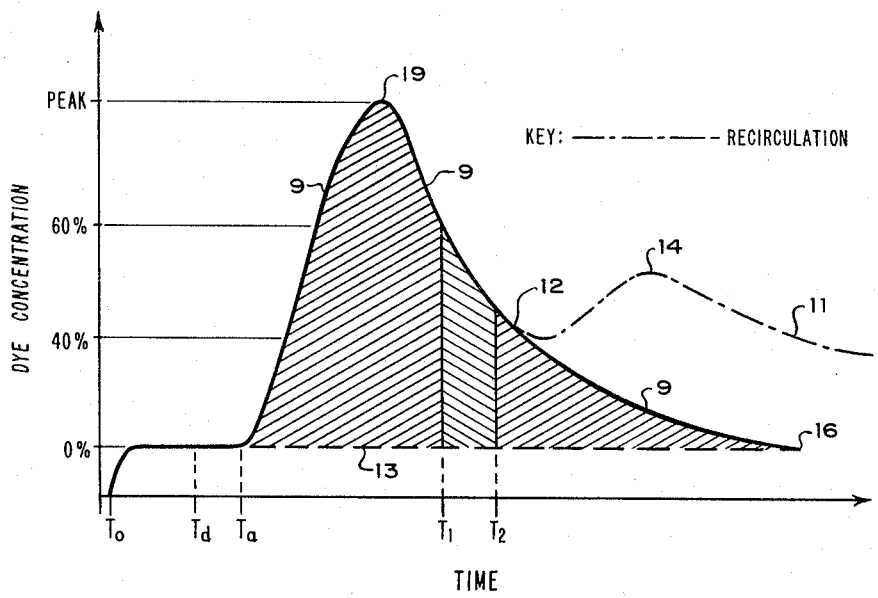
Figure 3:
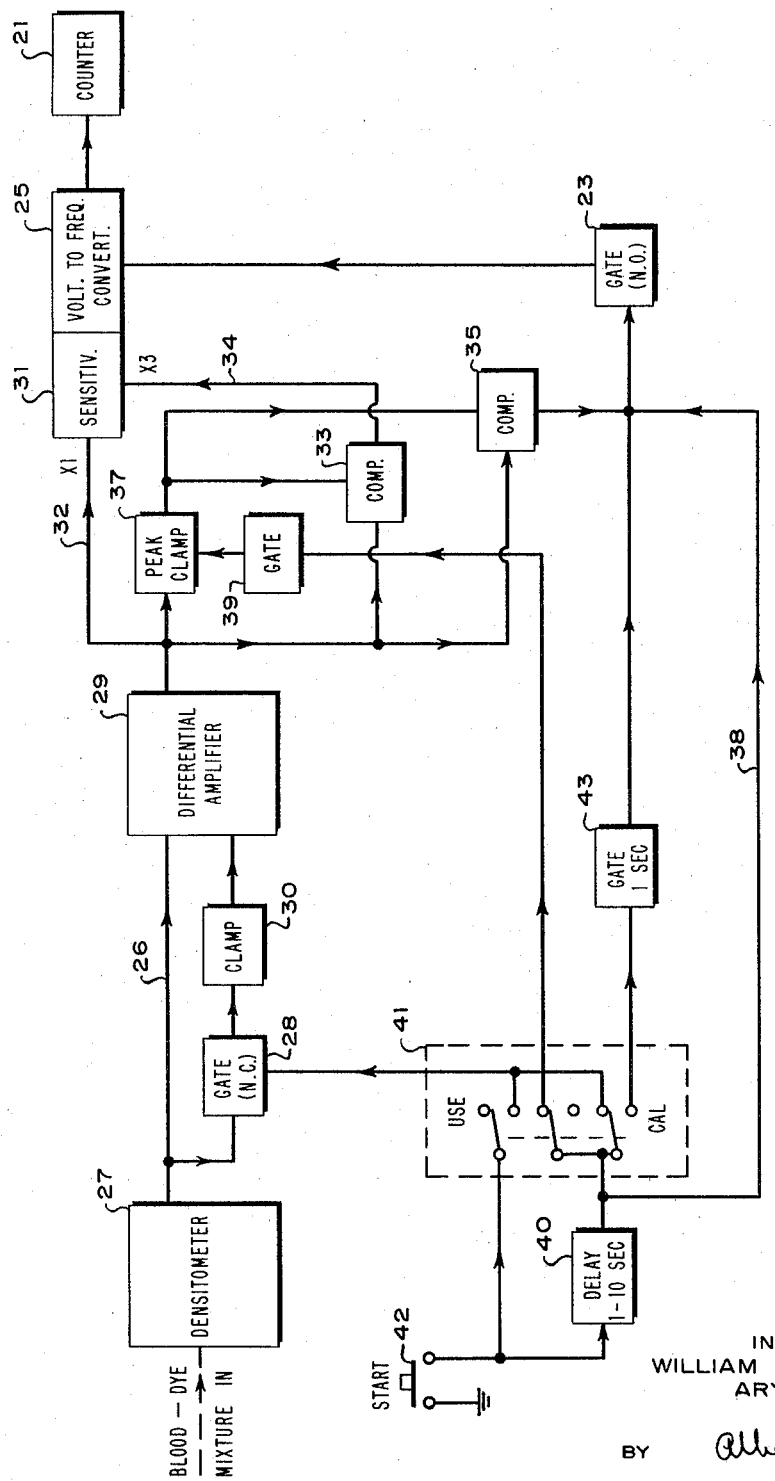

Other incidental objects of the present invention will be apparent from a reading of this specification and an inspection of the accompanying drawing in which:

FIGURE 1 shows a typical set of calibration curves;
FIGURE 2 shows a typical dye curve with and without recirculation; and
FIGURE 3 shows a block diagram of the integrating apparatus of the present invention.

The graph of FIGURE 1a shows a curve of the response of a desitometer to whole blood only. The densitometer response rises to a level which remains substantially constant with time. After a time $t_d$, a sample of this response is taken for a time $t_s$. The area under this sampled portion is represented by a totalized count proportional to the product of densitometer output times $t_s$.

The graph of FIGURE 1b shows the response of the densitometer to a mixture of whole blood and a known amount of dye. The densitometer response rises to a level which is higher than the level shown in FIGURE 1a and which is constant with time. After a selected time delay $t_d$ the response of the densitometer is sampled for a selected time $t_s$. The area under this sampled portion of the curve is represented by a totalized count proportional to the product of densitometer response times $t_s$. The difference between the totalized counts taken in these two calibration steps is represented by the shaded area of FIGURE 1b and is the calibration number. This number is used to determine the cardiac output from the totalized count provided by the dye curve integration cycle of operation.

Specifically:

$$\text{C.O.} = \frac{I \times 60}{\frac{\int c(t) dt}{K_d - K_b}} = \frac{I \times 60 \times (K_d - K_b)}{\int c(t) \cdot dt} \quad (1)$$

Where:

C.O.=cardiac output in litres per minute.
$I$=amount of dye injected in milligrams per litre.
$K_d$=totalized count obtained from the whole blood and a known amount of dye.
$K_b$=totalized count obtained from whole blood only.
$\int c(t) dt$=totalized count obtained from the dye curve integration.

Referring now to the graph of FIGURE 2, curve 9 represents a typical variation above a base line 13 of dye concentration with time in the absence of recirculation as determined from the injected dye method previously described. The base line 13 represents the response of a densitometer to whole blood. At time $t_a$ following the injection of dye into a vein of a patient, the concentration of dye in an artery of the patient increases with time from the base line 13 to a peak value 19. The dye concentration then falls off with time substantially exponentially toward the base line 13. The actual curve of dye concentration is affected by recirculation and does not follow the exponential decay to zero. Rather, the dye concentration again builds up with time from point 12 along curve 11 to a second peak value 14 which is lower than the first peak value 19. Cardiac output is related to the area under curve 9 from time $t_a$ to point 16 at which curve 9 decays to the base line 13. However, since recirculation occurs before the dye concentration decays to the base line 13, it is essential to obtain the desired information about cardiac output before recirculation of the dye affects the results. It can be shown that the integral (i.e., the area) of curve 9 above the base line 13 from time $t_a$ to point 16, which curve cannot be realized in practice because of recirculation, is equal to the integral of curve 9 between times $t_a$ and $t_1$ plus three times the integral of curve 9 between times $t_1$ and $t_2$.

This is shown by considering the following exponential equation:

$$f(t) = K\epsilon^{-\alpha t} \qquad (2)$$

We wish to prove that the integral of the exponential curve defined by Equation 2, from time $t_x$ (time $t_1$ of FIGURE 2), to infinity is equal to three times the integral of the exponential curve defined by Equation 2 between time $t_x$ and another time, $t_y$ (time $t_2$ of FIGURE 2). Thus:

$$\int_{t_x}^{\infty} f(t)dt = -\frac{1}{\alpha}K\epsilon^{-\alpha t}\Big|_{t_x}^{\infty} = \frac{1}{\alpha}K\epsilon^{-\alpha t_x} \qquad (3)$$

From Equation 2

$$K\epsilon^{-\alpha t_x} = f(x) \qquad (4)$$

Therefore $$\int_{t_x}^{\infty} f(t)dt = \frac{f(x)}{\alpha} \qquad (5)$$

Similarly, $$\int_{t_y}^{\infty} f(t)dt = \frac{f(y)}{\alpha} \qquad (6)$$

and $$\int_{t_x}^{t_y} f(t)dt = \frac{1}{\alpha}[f(x) - f(y)] \qquad (7)$$

If $f(x) = .6K$ and $f(y) = .4K$, then:

$$f(y) = 2/3 f(x) \qquad (8)$$

Thus, combining Equations 7 and 8 we get $$\int_{t_x}^{t_y} f(t)dt = \frac{1}{3\alpha} f(x) \qquad (9)$$

Combining Equations 5 and 9, we get $$\int_{t_x}^{\infty} f(t)dt = \frac{f(x)}{f(x) - f(y)} \int_{t_x}^{t_y} f(t)dt = 3 \int_{t_x}^{t_y} f(t)dt \qquad (10)$$

From this analysis we learn that it is only necessary to integrate curve 9 normally from time $t_x$ until the dye concentration drops to 60 percent of the peak value at time $t_1$. Thereafter the integration is increased by a factor of three until the dye concentration drops to 40 percent of the peak value at time $t_2$. The integration is then stopped. The same curve integration can also be performed by selecting the 60 percent and 30 percent points and by increasing the integration by a factor of 2 instead of by 3 as in the previous case. Results obtained in many actual tests indicate that the dye concentration is unaffected by recirculation at 40 percent of peak value and thus the above-described integration using 60 and 40 percent limits may be performed accurately.

The apparatus of FIGURE 3 performs the calibration and the dye curve integration automatically and displays the desired information about cardiac output on counter 21. Any suitable counter may be employed. One such counter is the Model 55 12A–4A available from Hewlett-Packard Company, Palo Alto, California. The counter 21 is connected to receive the pulses produced by voltage-to-frequency converter 25. Densitometer 27 responds to whole blood and to the mixture of whole blood and dye which is being monitored and produces a signal that is applied to the inputs of amplifier 29 through line 26 and through serially connected gate 28 and clamp 30. Although a densitometer has been shown and described it is to be understood that the desitometer may be any suitable detector which senses the heart pumping action on any known tracer. Known tracers include dyes, as mentioned, as well as radioactive tracers, cold or hot saline solutions, etc. In the event radioactive tracers are employed, suitable radioactive detectors would be employed in place of the desitometer 27. In like manner if cold saline solutions are employed, for example, a suitable temperature sensing detector would be used. One such temperature sensing detector is the Model 350–15 detector and its accompanying 140–12A thermister probe available from Hewlett-Packard Company, Palo Alto, California. The output of amplifier 29 is connected to input 32 of the sensitivity control 31 for the voltage-to-frequency converter 25, to one input of each of comparators 33 and 35 and to peak clamp 37. The output of peak clamp 37 is applied to the other inputs of each of comparators 33 and 35. The output of comparator 33 is connected to input 34 of sensitivity control 31. The output of comparator 35 is connected to gate 23 which, in turn, is connected to control the operation of the voltage-to-frequency converter 25. The output of delay timer 40 is connected to the normally open gate 23 by line 38 and is also connected to gate 23 through the selector switch 41 and one second gate 43. The output of delay timer 40 is also connected through selector switch 41 to gate 39 and to gate 28. Start switch 42 is connected to the input of delay timer 40 and to the input of gate 28 through selector switch 41.

The apparatus shown in FIGURE 3 operates in two cycles as previously noted, namely the calibration cycle and the integration cycle. The response of the densitometer 27 to whole blood only is calibrated by setting the selector switch 41 in the CAL position and by pressing start button 42 at time $t_0$. This opens the normally closed gate 28, and activates the delay timer 40. Peak clamp 37 and hence comparators 33 and 35 are rendered inoperative because gate 39 is disabled. The voltage-to-frequency converter 25 remains inoperative until normally open gate 23 is enabled. After a selected delay provided by delay timer 40 normally open gate 23 is enabled, thereby actuating voltage-to-frequency converter 25. Counter 21 counts the number of cycles of the signal produced by the converter 25. At the same time the one-second gate 43 is activated for a period of one second. At the end of one second gate 23 opens, thereby stopping the voltage-to-frequency converter 25 and terminating the calibration cycle on whole blood. This calibration cycle is represented by the graph of FIGURE 1a wherein the area of one second sample of the curve is represented by the count on counter 21. A similar calibration cycle as represented by the curve of FIGURE 1b is obtained on a mixture of whole blood and a known amount of dye. The shaded portion of the sample shown in FIGURE 1b represents the calibration number which is the difference of counts taken during the second and first calibration cycle.

The actual dye curve integration is obtained with the selector switch 41 set in the USE position. The appearance of the dye at the sampling site as shown at time $t_a$ in FIGURE 2 occurs a short time after the injection of dye at a remote injection site. Prior to the time of the appearance of the dye at the sampling site the densitometer 27 of FIGURE 3 responds to whole blood only and establishes base line 13 at an amplitude that is substantially equal ot the amplitude of the calibration curve shown in FIGURE 1a. The output of densitometer 27 is applied to both terminals of amplifier 29 through line 26 and through normally closed gate 28 and thus no differential amplification and no output signal is provided by the amplifier 29. Clamp 30 charges to the value of the signal which establishes the base line 13. A short time delay $t_d$ (determined by delay timer 40) after the injection time, normally closed gate 28 opens, gate 39 is enabled and the normally open gate 23 closes thereby actuating the voltage-to-frequency converter 25. After the gate 28 opens amplifier 29 responds only to signals on line 26 which vary about the value to which the clamp 30 is charged. The apparatus thus senses its own base line and responds only to the variations in dye concentration above the base line 13. As the dye concentration increases, signal at the output of amplifier 29 is applied to the input 32 of sensitivity control 31 for the voltage-to-frequency converter 25. The voltage-to-frequency converter 25 is thus operated at normal sensitivity and the count registered by counter 21 represents the normal integration of the dye concentration with time. When the input signal to amplifier 29 attains a maximum value, peak clamp 37 responds thereto and provides a signal at the input of comparator 33 which is equal to 60 percent of the peak value and a signal at the input of comparator 35 which is equal to 40 percent of the peak value. Counter 21 continues to count the pulses produced by voltage-to-frequency converter 25 until the output of amplifier 29 decreases to 60 percent of the maximum value. At this moment, comparator 33 produces a signal at input 34 of the sensitivity control 31 which causes the voltage-to-frequency converter 25 to increase its sensitivity to applied voltages by a factor of three. Thus, for a given applied voltage, the voltage-to-frequency converter 25 produces output signals having a repetition rate that is three times larger than previously for the same given applied voltage. Counter 21 continues to count the signals at the increased repetition rate as the signal at the output of amplifier 29 decays below the 60 percent mark. A signal is produced by comparator 35 in response to the decrease of the signal at the output of amplifier 29 to 40 percent of maximum value, which signal opens gate 23 and causes the voltage-to-frequency converter 25 to stop operating. Thus, below the 40 percent mark the counter ceases to operate and no additional variations of the signal appearing at terminal 27 due, for example, to the affects of recirculation, can affect the count registered by counter 21. The desired information about cardiac output is thus related to the count of signals taken by counter 21 during the intervals required for the signal produced by densitometer 27 to increase with time to a peak value and for the signal to decay to 40 percent of its peak value. This count of signals, adjusted by the calibration number previously obtained, yields the desired cardiac output in such convenient units as litres per minute. The circuit elements are reset to initial conditions before another dye curve integration is performed.

We claim:

1. Apparatus for integrating a function, said apparatus comprising:
   first circuit means forming pulses having a repetition rate related by a first factor to the value of said function;
   a counter;
   means for applying said pulses to said counter;
   means producing first and second signals related to the peak value of said function;
   second circuit means to form pulses related by a second factor of the value of said function in response to a predetermined relationship between the value of said function and said first signal;
   means for applying said last-mentioned pulses to said counter; and
   means to prevent the application of pulses to said counter in response to a predetermined relationship between the value of said function and said second signal.

2. Apparatus for integrating a function, the apparatus comprising:
   means forming signals having a first repetition rate related ot the value of said function;
   means responsive to the peak value of said function for producing first and second signals related to said peak value;
   a counter to count said signals having a first repetition rate for a selected period, the period beginning at the start of said function and ending when the function passes beyond the peak value and decreases to a value related to said first signal;
   and means forming signals having a second repetition rate related to the value of said function;
   said counter being adapted to count said signals having a second repetition rate for a selected period, said last-mentioned period beginning when the value of said function is related to said first signal and ending when the value of said function is related to said second signal.

3. Apparatus for integrating a function, the apparatus comprising:
   means forming signals having a low repetition rate related to the instantaneous value of said function;
   means responsive to the peak value of said function for producing first and second signals related to said peak value;
   a counter to count said signals having a low repetition rate for a selected period, the period beginning at the start of said function and ending when the function passes beyond said peak value and decreases to a value related to said first signal;
   and means forming signals having a high repetition rate related to the instantaneous value of said function;
   said counter being adapted to count said signals having a high repetition rate for a selected period, said last-mentioned period beginning when the value of said function is related to said first signal and ending when the value of said function is related to said second signal.

4. Apparatus for integrating an applied signal, said apparatus comprising:
   first circuit means forming pulses having a repetition rate related by a first factor to the value of said applied signal;
   a gate; a counter;
   means including said gate for applying said pulses to said counter;
   means producing first and second signals related to the peak value of said applied signal;
   second circuit means to form pulses related by a second factor to the value of said applied signal in response to a predetermined relationship between said applied signal and said first signal;
   means including said gate for applying said last-mentioned pulses to said counter;
   and means including said gate to prevent the application of pulses to said counter in response to a predetermined relationship between said applied signal and said second signal.

5. Apparatus for integrating an applied signal, said apparatus comprising:
   a voltage-to-frequency converter for producing output signals having a frequency related by a first factor to the value of said applied signal;
   a gate; a counter;
   means including said gate for applying said output signals to said counter;
   clamping means producing first and second signals related to the peak value of said applied signal;
   circuit means adapted to increase the frequency of the output signals produced by said voltage-to-frequency converter for a given signal applied thereto;
   means including said circuit means and said voltage-to-frequency converters to produce output signals having a frequency related by a second factor to the value of said applied signal in response to the equality of said applied signal and said first signal;
   means including said gate for applying said last-mentioned output signals to said counter; and
   means including said gate to prevent the application of said output signals to said counter in response to the equality of said applied signal and said second signal.

References Cited by the Examiner

UNITED STATES PATENTS 2,603,123  7/1952  Loukomsky et al. _____ 235—92

MAYNARD R. WILBUR, *Primary Examiner.*

JOHN F. MILLER, *Examiner.*